US011120477B2

(12) United States Patent
Slomkowski et al.

(10) Patent No.: US 11,120,477 B2
(45) Date of Patent: *Sep. 14, 2021

(54) SYSTEM AND METHOD FOR PERSONALIZED PREFERENCE OPTIMIZATION

(71) Applicants: Robin S Slomkowski, Eugene, OR (US); Richard A Rothschild, London (GB)

(72) Inventors: Robin S Slomkowski, Eugene, OR (US); Richard A Rothschild, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/078,095

(22) Filed: Oct. 23, 2020

(65) Prior Publication Data
US 2021/0042794 A1  Feb. 11, 2021

Related U.S. Application Data

(63) Continuation of application No. 15/256,543, filed on Sep. 3, 2016, now Pat. No. 10,872,354.

(60) Provisional application No. 62/214,496, filed on Sep. 4, 2015.

(51) Int. Cl.
| | |
|---|---|
| *G06Q 30/02* | (2012.01) |
| *G06K 9/00* | (2006.01) |
| *G06F 16/435* | (2019.01) |
| *H04L 29/08* | (2006.01) |

(52) U.S. Cl.
CPC ....... *G06Q 30/0269* (2013.01); *G06F 16/436* (2019.01); *G06K 9/00302* (2013.01); *G06K 2009/00939* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,160,552 B2* | 4/2012 | Stone | ................. | G06Q 30/0207 455/414.1 |
| 2012/0329432 A1* | 12/2012 | Gupta | .................... | G06Q 30/02 455/414.1 |

(Continued)

OTHER PUBLICATIONS

Solanki et al . . . "Estimation of the User's Emotional State by Keystroke Dynamics", May 2014, International Journal of Computer Applications, vol. 94, No. 13, pp. 21-23 (Year: 2014).*

*Primary Examiner* — John Van Bramer
(74) *Attorney, Agent, or Firm* — Fitzsimmons IP Law

(57) ABSTRACT

A system and method is provided for using biometric data from an individual to determine at least one emotion, mood, physical state, or mental state ("state") of the individual, which is then used, either alone or together with other data, to provide the individual with certain web-based data. In one embodiment of the present invention, a Web host is in communication with at least one network device, where each network device is operated by an individual and is configured to communicate biometric data of the individual to the Web host. The Web host is then configured to use the biometric data to determine at least one state of the individual. The determined state, either alone or together with other data (e.g., interest data), is then used to provide the individual with certain content (e.g., web-based data) or to perform a particular action.

20 Claims, 6 Drawing Sheets

(56) References Cited

U.S. PATENT DOCUMENTS

| | | | | |
|---|---|---|---|---|
| 2014/0329214 A1* | 11/2014 | Bitoun | ............... | A61B 5/02055 |
| | | | | 434/262 |
| 2015/0348122 A1* | 12/2015 | Cornell | .............. | G06Q 30/0261 |
| | | | | 705/14.58 |
| 2016/0232244 A1* | 8/2016 | Liu | ......................... | G06F 3/011 |

* cited by examiner

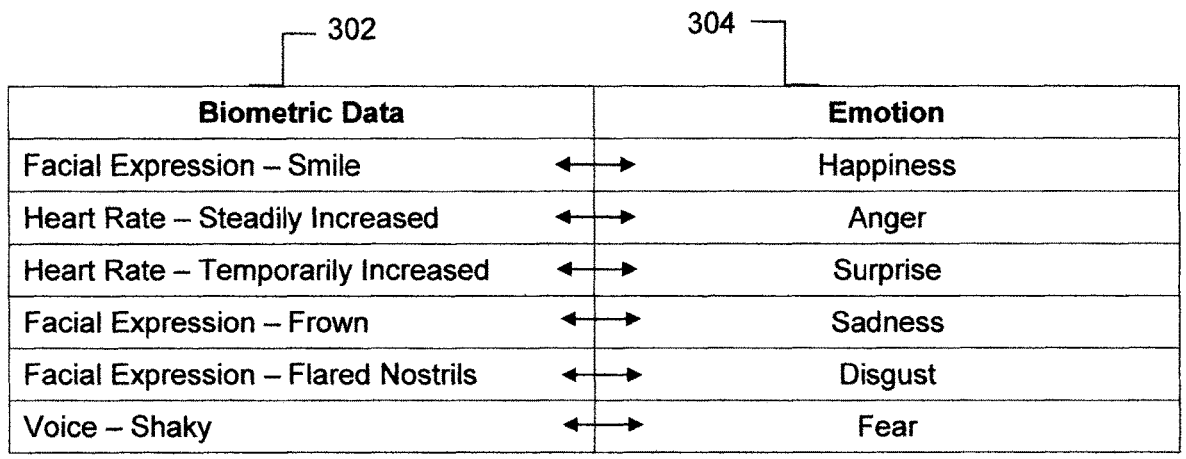

| Biometric Data | | Emotion |
|---|---|---|
| Facial Expression – Smile | ↔ | Happiness |
| Heart Rate – Steadily Increased | ↔ | Anger |
| Heart Rate – Temporarily Increased | ↔ | Surprise |
| Facial Expression – Frown | ↔ | Sadness |
| Facial Expression – Flared Nostrils | ↔ | Disgust |
| Voice – Shaky | ↔ | Fear |

Figure 3

| Response | Interest | Emotion | Thing |
|---|---|---|---|
| Feel-Good Content | 8/10 | Sadness | N/A |
| Matchmaking Service | $2.50 CPM | Happiness | Weddings |
| Jewelry Sale | $5.00 CPC | Excitement | Diamonds |

Figure 4

| reference-id | entity-id | sensor-label | numeric-value | time |
|---|---|---|---|---|

Biometric-Sensor Data

Figure 6

| reference-id | entity-id | emotion-label | time | emotional-intensity | creation |
|---|---|---|---|---|---|

Emotional-Response Data

Figure 7

| ref-id | entity-id | emotion-ref | thing-ref | time | correlation-factor | emotional-intensity | creation |
|---|---|---|---|---|---|---|---|

Emotion-Thing Data

Figure 8

| reference-id | entity-id | thing-reference | time | correlation-factor | creation |
|---|---|---|---|---|---|

Thing Data

Figure 9

SYSTEM AND METHOD FOR PERSONALIZED PREFERENCE OPTIMIZATION

CROSS-REFERENCE TO RELATED APPLICATION

This application claims priority pursuant to 35 U.S.C. § 119(e) to U.S. Provisional Application No. 62/214,496, filed Sep. 4, 2015, which application is specifically incorporated herein, in its entirety, by reference.

BACKGROUND OF THE INVENTION

1. Field of the Invention

The present invention relates to use of biometric data from an individual to determine at least one emotional state, mood, physical state, or mental state ("state") of the individual, either (i) at a particular time or (ii) in response to at least one thing in a proximity of the individual at a time that the biometric data is being collected, and using the at least one state, either by itself or together with other data (e.g., data related to the at least one thing, interest data, at least one request (e.g., question, command, etc.), etc.) to provide a particular response (e.g., provide certain web-based data to the individual, perform a particular action, etc.).

2. Description of Related Art

Recently, devices have been developed that are capable of measuring, sensing, or estimating at least one metric related to a human characteristic, commonly referred to as biometric data. For example, devices that resemble watches have been developed that are capable of measuring an individual's heart rate or pulse, and using that data together with other information (e.g., the individual's age, weight, etc.) to calculate a resultant, such as the total calories burned by the individual in a given day. Similar devices have been developed for measuring, sensing, or estimating other metrics, such as blood pressure, breathing patterns, and blood-alcohol level, or for the identification or recognition of individuals in, amongst others, security applications, through the recording and analysis with devices such as iris scanners, or microphones with voice pattern recognition, of the individual's unique biometric or physiological characteristics, to name a few. These devices are generically referred to as biometric devices.

While the types of biometric devices continue to grow, the way in which biometric data is used remains relatively stagnant. For example, heart rate data is typically used to give an individual information on their pulse and calories burned. By way of another example, eye movement data can be used to determine whether and to what extent the individual is under the influence of alcohol. By way of yet another example, an individual's breathing pattern may be monitored by a doctor, nurse, or medical technician to determine whether the individual suffers from sleep apnea.

While biometric data is useful in and of itself, such data may also indicate how the individual is feeling (e.g., at least one emotional state, mood, physical state, or mental state) at a particular time or in response to the individual being in the presence of at least one thing (e.g., a person, a place, textual content (or words included therein or a subject matter thereof), video content (or a subject matter thereof), audio content (or words included therein or a subject matter thereof), etc.). Thus, it would be advantageous, and a need exists, for a system and method that uses the determined state (e.g., emotion state, mood, physical state, or mental state), either alone or together with other information (e.g., at least one thing, interest data, at least one request (e.g., question, command, etc.), etc.), to produce a certain result, such as provide the individual with certain web-based content (e.g., a certain web page, a certain advertisement, etc.) and/or perform at least one action. While providing a particular message to every known biometric state may not be reasonable for content creators to understand and target, human emotions and moods provide a specific context for targeting messages that is easily understood by content creators.

SUMMARY OF THE INVENTION

The present invention is directed toward personalization preference optimization, or to the use of biometric data from an individual to determine at least one emotional state, mood, physical state, or mental state ("state") of the individual, which is then used, either alone or together with other data (e.g., at least one thing in a proximity of the individual at a time that the individual is experiencing the emotion, interest data from a source of web-based data (e.g., bid data, etc.), etc.) to provide the individual with certain web-based data or to perform a particular action.

Preferred embodiments of the present invention operate in accordance with a Web host in communication with a plurality of content providers (i.e., sources) and at least one network device via a wide area network (WAN), wherein the network device is operated by an individual and is configured to communicate biometric data of the individual to the Web host. The content providers provide the Web host with content, such as websites, web pages, image data, video data, audio data, advertisements, etc. The Web host is then configured to receive biometric data from the network device, where the biometric data is acquired from and/or associated with an individual that is operating the network device. An application is then used to determine at least one emotion, mood, physical state, or mental state from the received biometric data. This is done using known algorithms and/or correlations between biometric data and various states, as stored in the memory device.

In one embodiment of the present invention, content providers may express interest in providing the web-based data to an individual in a particular emotional state. In another embodiment of the present invention, content providers may express interest in providing the web-based data to an individual or other concerned party (such as friends, employer, care provider, etc.) that experienced a particular emotion in response to a thing (e.g., a person, a place, a subject matter of textual content, a subject matter of video content, a subject matter of audio content, etc.). The interest may be a simple "Yes" or "No," or may be more complex, like interest on a scale of 1-10, an amount the content owner is willing to pay per impression (CPM), or an amount the content owner is willing to pay per click (CPC).

The interest data, alone or in conjunction with other data (e.g., randomness, demographics, etc.), may be used by the application to determine content data (e.g., an advertisement, etc.) that should be provided to the individual. For example, if the interest data includes different bids for a particular emotion or an emotion-thing relationship, the application may provide the advertisement with the highest bid to the individual that experienced the emotion. In other embodiments, other data is taken into consideration in providing content to the individual. In these embodiments, at least interest data is taken into account in selecting the content that is to be provided to the individual.

In one method of the present invention, biometric data is received from an individual and used to determine a corresponding emotion of the individual, such as happiness, anger, surprise, sadness, disgust, or fear. It is to be understood that emotional categorization is hierarchical and that such a method may allow targeting more specific emotions such as ecstasy, amusement, or relief, which are all subsets of the emotion of joy. A determination is made as to whether the emotion is the individual's current state, or whether it is based on the individual's response to a thing (e.g., a person, place, information displayed to the individual, etc.). If the emotion is the individual's current state, then content is selected based on at least the individual's current emotional state and interest data. If, however, the emotion is the individual's response to a thing, then content is selected based on at least the individual's emotional response to the thing (or subject matter thereof) and interest data. The selected content is then provided to the individual, or network device operated by the individual.

Emotion, mood, physical, or mental state of an individual can also be taken into consideration when performing a particular action or carrying out a particular request (e.g., question, command, etc.). In other words, prior to performing a particular action (e.g., under the direction of an individual, etc.), a network-connected or network-aware system or device may take into consideration an emotion, mood, physical, or mental state of the individual. For example, a command or instruction provided by the individual, either alone or together with other biometric data related to or from the individual, may be analyzed to determinate the individual's current mood, emotional, physical, or mental state. The network-connected or network-aware system or device may then take the individual's state into consideration when carrying out the command or instruction. Depending on the individual's state, the system or device may warn the individual before performing the requested action, or may perform another action, either in additional to or instead of the requested action. For example, if it is determined that a driver of a vehicle is angry or intoxicated, the vehicle may provide the driver with a warning before starting the engine, may limit maximum speed, or may prevent the driver from operating the vehicle (e.g., switch to autonomous mode, etc.).

A more complete understanding of a system and method for using biometric data to determine at least one emotional state, mood, physical state, or mental state ("state") of an individual, wherein at least said state is used to provide or perform a particular result, will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 3 provides an exemplary chart that links different biometric data to different emotions;

FIG. 4 provides an exemplary chart that links different responses to different emotions, different things, and different interest levels in the same;

FIG. 6 provides an exemplary biometric-sensor data string in accordance with one embodiment of the present invention;

FIG. 7 provides an exemplary emotional-response data string in accordance with one embodiment of the present invention;

FIG. 8 provides an exemplary emotion-thing data string in accordance with one embodiment of the present invention;

FIG. 9 provides an exemplary thing data string in accordance with one embodiment of the present invention;

DETAILED DESCRIPTION OF THE PREFERRED EMBODIMENT

The present invention is described as personalization preference optimization, or using at least one emotional state, mood, physical state, or mental state ("state") of an individual (e.g., determined using biometric data from the individual, etc.) to determine a response, which may include web-based data that is provided to the individual as a result of the at least one state, either alone or together with other data (e.g., at least one thing (or data related thereto) in a proximity of the individual at a time that the individual is experiencing the at least one emotion, etc.).

Figure 1:
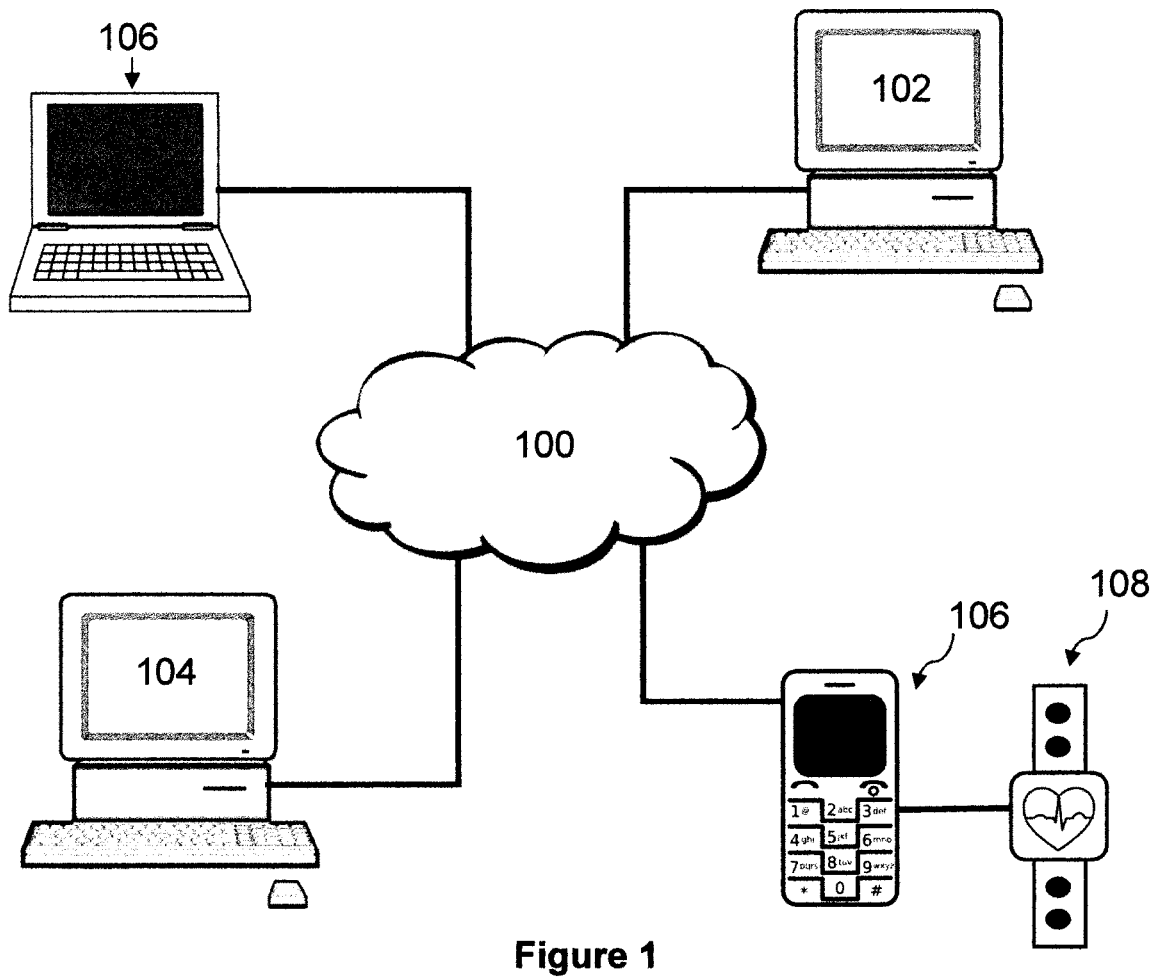
FIG. 1 illustrates a Web host in communication with at least one content provider and at least one network device via a wide area network (WAN), wherein said Web host is configured to provide certain content to the network device in response to biometric data (or data related thereto), as received from the network device.

As shown in FIG. 1, preferred embodiments of the present invention operate in accordance with a Web host 102 in communication with at least content provider (e.g., provider of web-based data) 104 and at least one network device 106 via a wide area network (WAN) 100, wherein each network device 106 is operated by an individual and is configured to communicate biometric data of the individual to the Web host 102, where the biometric data is acquired using at least one biometric sensor 108.

While FIG. 1 depicts the preferred embodiment, it should be appreciated that other embodiments are within the spirit and scope of the present invention. For example, the network device 106 itself may be configured to collect (e.g., sense, etc.) biometric data on the individual. This may be accomplished, for example, through the use of at least one microphone (e.g., to acquire voice data from the individual), at least one camera (e.g., to acquire video data on the individual), at least one heart rate sensor (e.g., to measure heart rate data on the individual), at least one breath sensor (e.g., to measure breath chemical composition of the individual), etc. By way of another example, the host may be configured to communicate directly with the network device, for example using a wireless protocol such as Bluetooth, Wi-Fi, etc. By way of yet another example, the host may be configured to acquire biometric data directly from the individual using, for example, at least one microphone, at least one camera, or at least one sensor (e.g., a heart rate sensor, a breath sensor, etc.). In this example, the host may be configured to provide data to the individual (e.g., display data on a host display) or perform at least one action (e.g., switch an automobile to autopilot, restrict speed, etc.).

Figure 2:
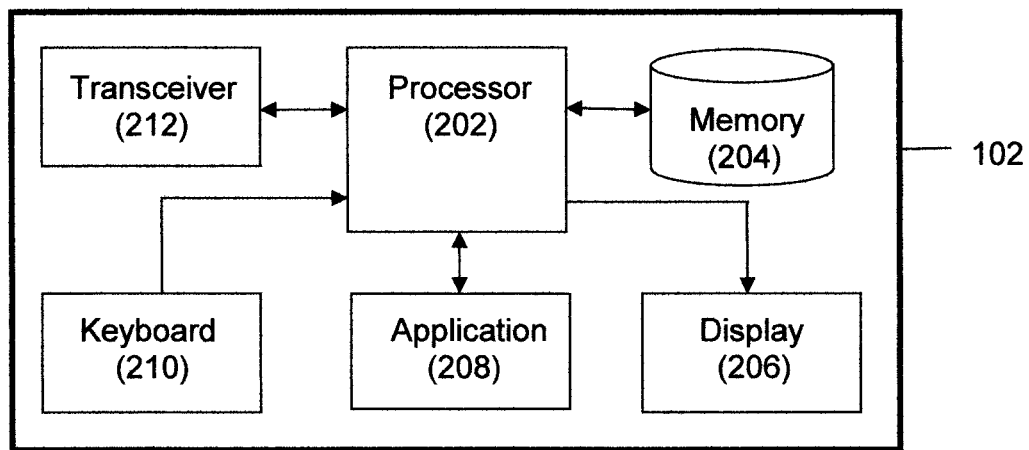
FIG. 2 illustrates one embodiment of the Web host depicted in FIG. 1.

With reference to FIGS. 1 and 2, the content provider 104 provides the Web host 102 with web-based data, such as a website, a web page, image data, video data, audio data, an advertisement, etc. Other web-based data is further provided to the Web host 102 by at least one other content provider (not shown). The plurality of web-based data (e.g., plurality of websites, plurality of web pages, plurality of image data, plurality of video data, plurality of audio data, plurality of advertisements, etc.) is stored in a memory device 204 along with other data (discussed below), such as information that links different biometric data to different states (see FIG. 3) and interest data (see FIG. 4). It should be appreciated that the present invention is not limited to the memory device 204 depicted in FIG. 2, and may include additional memory devices (e.g., databases, etc.), internal and/or external to the Web host 102.

The Web host 102 is then configured to receive biometric data from the network device 106. As discussed above, the biometric data is preferably related to (i.e., acquired from) an individual who is operating the network device 106, and may be received using at least one biometric sensor 108, such as an external heart rate sensor, etc. As discussed above, the present invention is not limited to the biometric sensor 108 depicted in FIG. 1, and may include additional (or different) biometric sensors (or the like, such as microphones, cameras, etc.) that are external to the network device 106, and/or at least one biometric sensor (or the like, such as microphones, cameras, etc.) internal to the network device. If the biometric sensor is external to the network device, it may communicate with the network device via at least one wire and/or wirelessly (e.g., Bluetooth, Wi-Fi, etc.).

It should be appreciated that the present invention is not limited to any particular type of biometric data, and may include, for example, heart rate, blood pressure, breathing rate, temperature, eye dilation, eye movement, facial expressions, speech pitch, auditory changes, body movement, posture, blood hormonal levels, urine chemical concentrations, breath chemical composition, saliva chemical composition, and/or any other types of measurable physical or biological characteristics of the individual. The biometric data may be a particular value (e.g., a particular heart rate, etc.) or a change in value (e.g., a change in heart rate), and may be related to more than one characteristic (e.g., heart rate and breathing rate).

It should also be appreciated that while best results come from direct measurement of known individuals, the same methods of correlation can be applied to general categories of people. An example is that a facial recognition system may know that 90% of the people at a particular location, such as a hospital, are fearful and that an individual is known to be at that location. Even if biometric data of that individual is not shared with the system, the correlation may be applied, preserving privacy and still allowing for statistically significant targeting. Another example would be a bar that had urine chemical analyzers integrated into the bathrooms, providing general information about people at the bar. This data could then be coordinated with time and location back to a group of people and provide significant correlations for targeting messages to an individual (e.g., an individual who was at the bar during that time).

As shown in FIG. 2, the Web host 102 includes an application 208 that is configured to determine at least one state from the received biometric data. This is done using known algorithms and/or correlations between biometric data and different states, such as emotional states, as stored in the memory device 204. For example, as shown in FIG. 3, if the biometric data 302 indicates that the individual is smiling (e.g., via use of at least one camera), then it may be determined that the individual is experiencing the emotion 304 of happiness. By way of other examples, if the biometric data 302 indicates that the individual's heart rate is steadily increasing (e.g., via use of a heart rate sensor), then it may be determined that the individual is experiencing the emotion 304 of anger. If the biometric data 302 indicates that the individual's heart rate temporarily increases (e.g., via use of a heart rate sensor), then it may be determined that the individual is experiencing the emotion 304 of surprise. If the biometric data 302 indicates that the individual is frowning (e.g., via use of at least one camera), then it may be determined that the individual is experiencing the emotion 304 of sadness. If the biometric data 302 indicates that the individual's nostrils are flaring (e.g., via use of at least one camera), then it may be determined that the individual is experiencing the emotion 304 of disgust. And if the biometric data 302 indicates that the individual's voice is shaky (e.g., via use of at least one microphone), then it may be determined that the individual is experiencing the emotion 304 of fear.

Information that correlates different biometric data to different emotions or the like can come from different sources. For example, the information could be based on laboratory results, self-reporting trials, and secondary knowledge of emotions (e.g., the individual's use of emoticons and/or words in their communications). Because some information is more reliable than other information, certain information may be weighted more heavily than other information. For example, in certain embodiments, clinical data is weighted heavier than self-reported data. In other embodiments, self-reported data is weighted heavier than clinical data. Laboratory (or learned) results may include data from artificial neural networks, C4.5, classification and/or regression trees, decision trees, deep learning, dimensionality reduction, elastic nets, ensemble learning, expectation maximization, k-means, k-nearest neighbor, kernel density estimation, kernel principle components analysis, linear regression, logical regression, matrix factorization, naïve bayes, neighbor techniques, partial least squares regression, random forest, ridge regression, support vector machines, multiple regression and/or all other learning techniques generally known to those skilled in the art.

Self-reported data may include data where an individual identifies their current state, allowing biometric data to be customized for that individual. For example, computational linguistics could be used to identify not only what an individual is saying but how they are saying it. In other words, the present invention could be used to analyze and chart speech patterns associated with an individual (e.g., allowing the invention to determine who is speaking) and speech patterns associated with how the individual is feeling. For example, in response to "how are you feeling today," the user may state "right now I am happy," or "right now I am sad." Computational linguistics could be used to chart differences in the individual's voice depending on the individual's current emotional state, mood, physical state, or mental state. Because this data may vary from individual to individual, it is a form of self-reported data, and referred to herein as personalized artificial intelligence. The accuracy of such data, learned about the individual's state through analysis of the individual's voice (and then through comparison both to the system's historical knowledge base of states of the individual acquired and stored over time and to a potential wider database of other users' states as defined by analysis of their voice), can further be corroborated and or improved, through cross-referencing the individual's self-reported data with other biometric data, such as heart rate data, etc., when a particular state is self-reported and detected and recorded by the system onto its state profile database.

The collected data, which is essentially a speech/mood profile for the individual (a form of ID which is essentially the individual's unique state profile), can be used by the system that gathered the biometric data or shared with other systems (e.g., the individual's smartphone, the individual's automobile, a voice or otherwise biometrically-enabled device or appliance (including Internet of Things (IOT) devices or IOT system control devices), Internet or "cloud" storage, or any other voice or otherwise biometrically-enabled computing or robotic device or computer operating system with the capability of interaction with the individual, including but not limited to devices which operate using voice interface systems such as Apple's Sir, Google Assistant, Microsoft Cortana, Amazon's Alexa, and their successor systems). Because the shared information is unique to an individual, and can be used to identify a current state of the individual, it is referred to herein as personalized artificial intelligence ID, or "PAIID." In one embodiment of the present invention, the self-reported data can be thought of as calibration data, or data that can be used to check, adjust, or correlate certain speech patterns of an individual with at least one state (e.g., at least one emotion, at least one mood, at least one physical state, or at least one mental state). The knowledge and predictive nature inherent in the PAID will be continuously improved through the application of deep learning methodology with data labelling and regression as well as other techniques apparent to those skilled in the art.

With respect to computational linguistics, it should be appreciated that the present invention goes beyond using simple voice analysis to identify a specific individual or what the individual is saying. Instead, the present invention can use computational linguistics to analyze how the individual is audibly expressing himself/herself to detect and determine at least one state, and use this determination as an element in providing content to the user or in performing at least one action (e.g., an action requested by the user, etc.).

It should be appreciated that the present invention is not limited to using a single physical or biological feature (e.g., one set of biometric data) to determine the individual's state. Thus, for example, eye dilation, facial expressions, and heart rate could be used to determine that the individual is surprised. It should also be appreciated that an individual may experience more than one state at a time, and that the received biometric data could be used to identify more than one state, and a system could use their analysis of the individual's state or combination of states to assist it in deciding how best to respond, for example, to a user request, or a user instruction, or indeed whether to do so at all. It should further be appreciated that the present invention is not limited to the six emotions listed in FIG. 3 (i.e., happiness, anger, surprise, sadness, disgust, and fear), and could be used to identify other (or alternate) emotional states, such as regret, love, anxiousness, etc. Finally, the present invention is not limited to the application 208 as shown in FIG. 2, and may include one or more applications operating on the Web host 102 and/or the network device 106. For example, an application or program operating on the network device 106 could use the biometric data to determine the individual's emotional state, with the emotional state being communicated to the Web host 102 via the WAN 100.

Despite preferred embodiments, the present invention is not limited to the use of biometric data (e.g., gathered using sensors, microphones, and/or cameras) solely to determine an individual's current emotional state or mood. For example, an individual's speech (either alone or in combination with other biometric data, such as the individual's blood pressure, heart rate, etc.) could be used to determine the individual's current physical and/or mental health. Examples of physical health include how an individual feels, such as healthy, good, poor, tired, exhausted, sore, achy, and sick (including symptoms thereof, such as fever, headache, sore throat, congested, etc.), and examples of mental health include mental states, such as clear-headed, tired, confused, dizzy, lethargic, disoriented, and intoxicated. By way of example, computational linguistics could be used to correlate speech patterns to at least one physical and/or mental state. This can be done using either self-reported data (e.g., analyzing an individual's speech when the individual states that they are feeling fine, under the weather, confused, etc.), general data that links such biometric data to physical and/or mental state (e.g., data that correlates speech patterns (in general) to at least one physical and/or mental states), or a combination thereof. Such a system could be used, for example, in a hospital to determine a patient's current physical and/or mental state, and provide additional information outside the standard physiological or biometric markers currently utilized in patient or hospital care. If the physical and/or mental state is above/below normal (N), which may include a certain tolerance (T) in either direction (e.g., N+/−T) through the patient making a request or statement, or through response to a question generated by the system, a nurse or other medical staff member may be notified. This would have benefits such as providing an additional level of patient observation automation or providing early warning alerts or reassurance about the patient through system analysis of their state.

As shown in FIG. 2, the Web host 102 may also include other components, such as a keyboard 210, allowing a user to enter data, a display 206, allowing the Web host 102 to display information to the user (or individual in embodiments where the biometric sensors are internal to the Web Host 102), a transceiver 212, allowing the Web host 102 to communicate with external devices (e.g., the network device 106 via the WAN 100, the network device 106 via a wireless protocol, an external biometric sensor via a wireless protocol, etc.), and a processor 202, which may control the reception and/or transmission of information to internal and/or external devices and/or run the application 208, or machine-readable instructions related thereto.

In one embodiment of the present invention, a source of web-based data (e.g., content provider) may express interest in providing the web-based data to an individual in a particular emotional state. For example, as shown in FIG. 4, an owner of feel-good content (e.g., kittens in humorous situations, etc.) may express an interest in providing the content to individuals who are currently feeling the emotion of sadness. The interest may be as simple as "Yes" or "No,"

or may be more complex, like interest on a scale of 1-10. In another embodiment of the present invention, a source of web-based data may express interest in providing the web-based data to an individual that experienced a particular emotion in response to a thing (e.g., a person, a place, a subject matter of textual data, a subject matter of video data, a subject matter of audio data, etc.). For example, as shown in FIG. 4, an owner of a matchmaking service may express an interest ($2.50 CPM) in providing a related advertisement to individuals, their friends, or their contacts that experienced the emotion of happiness when they are in close proximity to a wedding (thing) (e.g., being at a wedding chapel, reading an email about a wedding, seeing a wedding video, etc.). By way of another example, an owner of a jewelry store may express an interest (5.00 CPC) in providing an advertisement to individuals that experienced the emotion of excitement when they are in close proximity to a diamond (thing) (e.g., being at a store that sells diamonds, reading an email about diamonds, etc. The selection of web-based content and/or interest may also be based on other data (e.g., demographic data, profile data, click-through responses, etc.). Again, the interest may be a simple "Yes" or "No," or may be more complex, like an interest on a scale of 1-10, an amount an owner/source of the content is willing to pay per impression (CPM), or an amount an owner/source of the content is willing to pay per click (CPC).

Another embodiment of the invention may involve a system integrated with at least one assistance system, such as voice controls or biometric-security systems, where the emotionally selected messages are primarily warnings or safety suggestions, and are only advertisements in specific relevant situations (discussed in more detail below). An example would be of a user who is using a speech recognition system to receive driving directions where the user's pulse and voice data indicate anger. In this case, the invention may tailor results to be nearby calming places and may even deliver a mild warning that accidents are more common for agitated drivers. This is an example where the primary purpose of the use is not the detection of emotion, but the emotion data can be gleaned from such systems and used to target messages to the individual, contacts, care-providers, employers, or even other computer systems that subscribe to emotional content data. An alternate example would be a security system that uses retinal scanning to identify pulse and blood pressure. If the biometric data correlates to sadness, the system could target the individual with uplifting or positive messages to their connected communication device or even alert a care-provider. In other instances, for example with a vehicle equipped with an autonomous driving system, based on the system's analysis of the biometric feedback of the individual, the driving system could advise on exercising caution or taking other action in the interests of the driver and others (e.g., passengers, drivers of other vehicles, etc.).

It should be noted that in this invention some use cases the individual's private data is provided with the users consent to the system, but in many cases the emotional response could be associated with a time-of-day, a place, or a given thing (e.g., jewelry shop, etc.), so personally identifying information (PII) does not need to be shared with the message provider. In the example of a jewelry shop, the system simply targets individuals and their friends with strong joy correlations. While in certain embodiments, individuals may be offered the opportunity to share their P with message providers, the system can function without this level of information.

The interest data, and perhaps other data (e.g., randomness, demographics, etc.) may be used by the application (FIG. 2 at 208) to determine web-based data (e.g., an advertisement, etc.) that should be provided to the individual. For example, if the interest data includes different bids for a particular emotion or an emotion-thing relationship, the application may provide the advertisement associated with the highest bid to the individual (or related network device) who experienced the emotion. In other embodiments, other data is taken into consideration in providing web-based data to the individual. In these embodiments, interest data is but one criteria that is taken into account in selecting web-based data that is provided to the individual.

Figure 10:
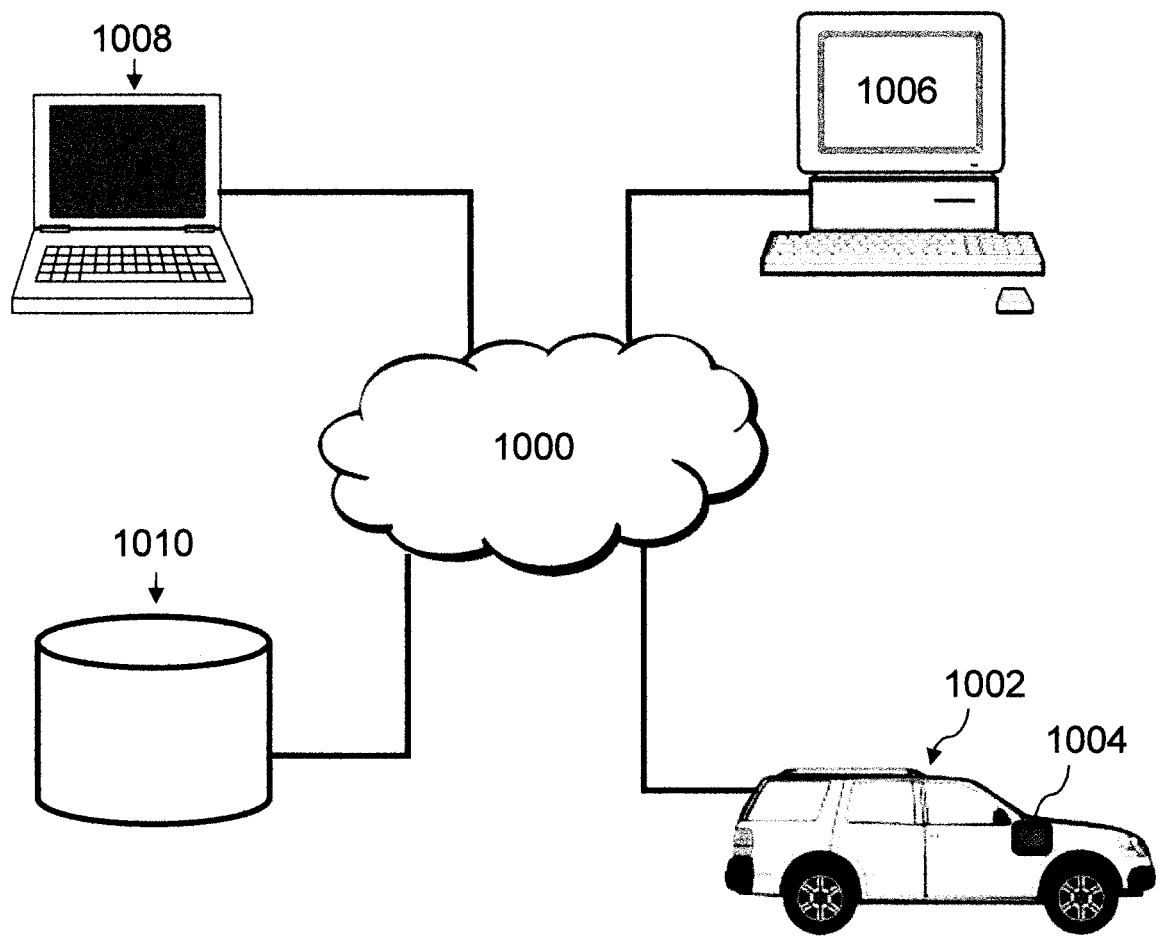
FIG. 10 illustrates a network-enabled device that is in communication with a plurality of remote devices via a wide area network (WAN) and is configured to use biometric data to determine at least one state of an individual and use the at least one state to perform at least one action.

It should be appreciated that the "response" to an individual in a particular state, or having an emotional response to a thing, is not limited to providing the individual with web-based content, and may include any action consistent with the determined state. In other words, the determined state can be used by the host (e.g., automobile, smartphone, etc.) to determine context, referred to herein as "situational context." For example, as shown in FIG. 10, an automobile 1002 may include a host 1004 that determines (using biometric data acquired via a camera, microphone, or sensor) that the driver (not shown) is impaired or emotional (e.g., angry, excited, etc.), may switch to auto-pilot, or may limit the maximum speed of the vehicle. In this embodiment, the "response" carried out by the host may be based on commands provided by the individual (e.g., verbal or otherwise) and at least one emotion or mood of the individual, where the emotion/mood is determined based on biometric data. For example, where a voice command to perform an action (by itself) may result in a robot performing an action at a normal pace (which may have the benefit of battery preservation, accuracy, etc.), a voice command to perform the same action along with biometric data expressing a mood of urgency may result in the robot performing the action at a quicker pace.

In one embodiment of the present invention, the host 1004 is a network-enabled device and is configured to communicate with at least one remote device (e.g., 1006, 1008, 1010) via a wide area network (WAN) 1000. For example, the host 1004 may be configured to store/retrieve individual state profiles (e.g., PAID) on/from a remote database (e.g., a "cloud") 1010, and/or share individual state profiles (e.g., PAID) with other network-enabled devices (e.g., 1006, 1008). The profiles could be stored for future retrieval, or shared in order to allow other devices to determine an individual's current state. As discussed above, the host 1004 may gather self-reporting data that links characteristics of the individual to particular states. By sharing this data with other devices, those devices can more readily determine the individual's current state without having to gather (from the individual) self-reporting (or calibration) data. The database 1010 could also be used to store historical states, or states of the individual over a period of time (e.g., a historical log of the individual's prior states). The log could then be used, either alone or in conjunction with other data, to determine an individual's state during a relevant time or time period (e.g., when the individual was gaining weight, at the time of an accident, when performing a discrete or specific action, etc.), or to determine indications as to psychological aptitude or fitness to perform certain functions where, for example an individual's state is of critical importance, such as, but not limited to piloting a plane, driving a heavy goods' vehicle, or trading instructions on financial or commodities exchanges.

The state log could be further utilized to generate a state "bot" which is an agent of the individual capable of being distributed over a network to look for information on behalf of the individual which is linked to a particular thing the individual has an "interest" in, or wishes to be informed of, either positive or negative, conditional on their being in that particular state.

Figure 11:
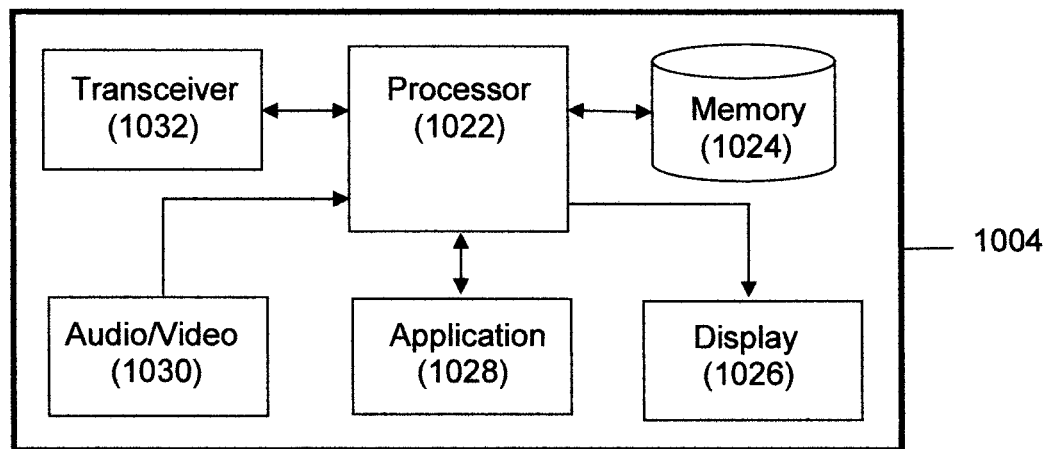
FIG. 11 illustrates one embodiment of the network-enabled device depicted in FIG. 10.

In an alternate embodiment, information, such as historical logs or individual state profiles (e.g., PAID) are also, or alternatively, stored on a memory device 1024 on the host 1004 (see FIG. 11). In this embodiment, the host 1004 may include a transceiver 1032, a processor 1022, a display 1026, and at least one application 1028 (see FIG. 11), all of which function the same as similar components depicted in FIG. 2. The host 1004 may also include at least one microphone and/or at least one camera 1030 configured to acquire audio/video from/of the individual (e.g., a driver of a vehicle). As previously discussed, the audio/video can be used to determine at least one state of the individual. For example, the individual's speech and/or facial features, either alone or in combination with other data (e.g., heart rate data acquired from sensors on the steering wheel, etc.), could be analyzed to determine at least one state of the individual. The state can then be used to perform at least one action. In one embodiment of the present invention, the state is used to determine whether a request (e.g., command, etc.) from the individual should be carried out, and if so, whether other actions should also be performed (e.g., limiting speed, providing a warning, etc.). For example, if a driver of a vehicle instructs the vehicle to start, the vehicle (or host operating therein) could provide the driver with a warning if it is determined that the driver is tired, or could initiate auto-pilot mode if it is determined that the driver is impaired (e.g., under the influence). In another example, an airline pilot could be asked to provide a response as to how they're feeling, and dependent on how the pilot responds, both by nature of the content of their reply and its analyzed state, air traffic control can seek to take the appropriate action to seek to ensure the safety of the plane. In this case, and cases of a similar nature or context failure to provide any kind of response would provide an alert which might indicate either that the pilot didn't wish to respond (which is information in itself) or was not in a situation to respond.

It should be appreciated that in embodiments where the individual is responding to a thing, the thing could be anything in close proximity to the individual, including a person (or a person's device (e.g., smartphone, etc.)), a place (e.g., based on GPS coordinates, etc.), or content shown to the user (e.g., subject matter of textual data like an email, chat message, text message, or web page, words included in textual data like an email, chat message, text message, or web page, subject matter of video data, subject matter of audio data, etc.). The "thing" or data related thereto can either be provided by the network device to the Web host, or may already be known to the Web host (e.g., when the individual is responding to web-based content provided by the Web host, the emotional response thereto could trigger additional data, such as an advertisement).

Figure 5:
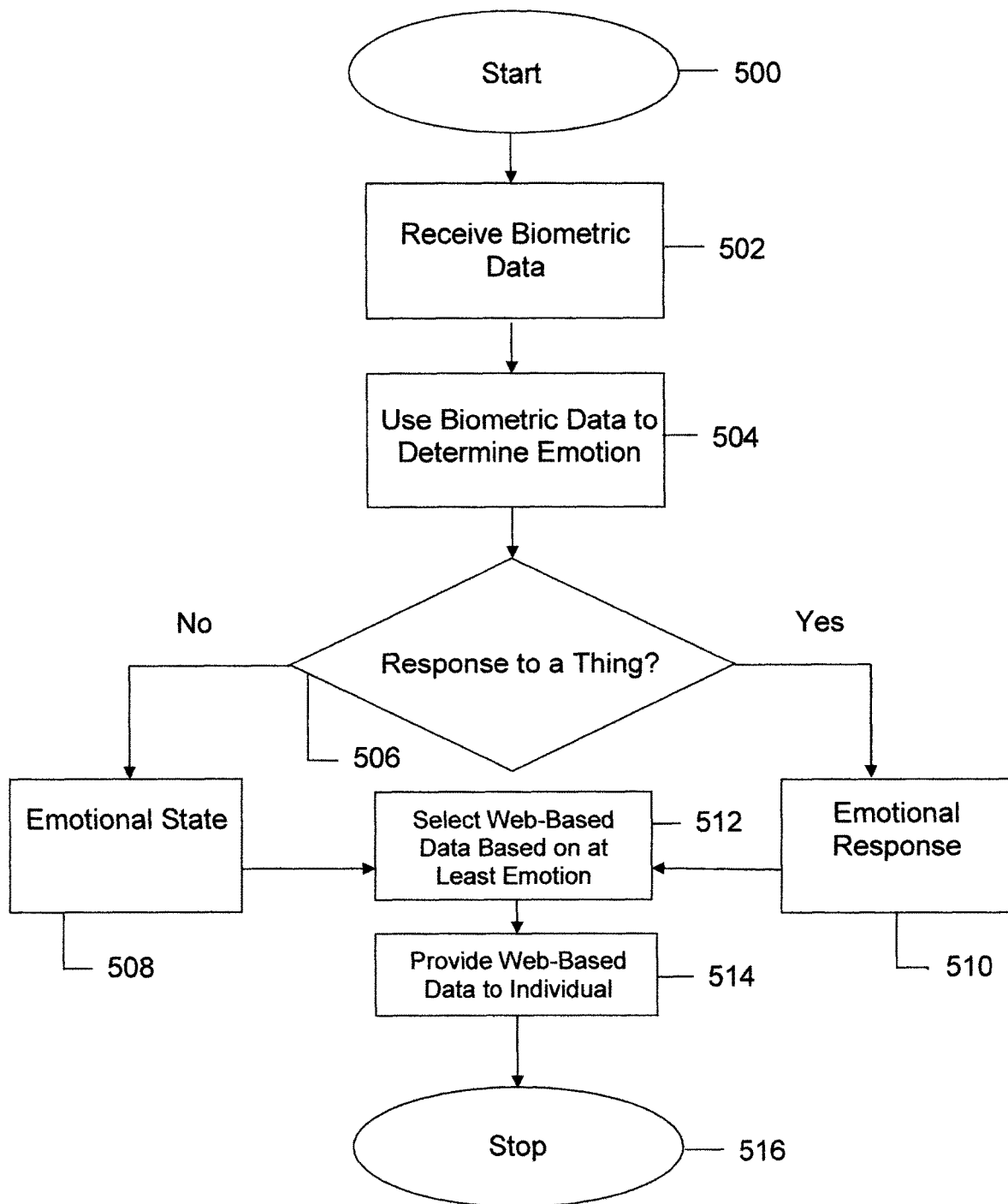
FIG. 5 illustrates a method in accordance with one embodiment of the present invention of using biometric data from an individual to determine at least one emotion of the individual, and using the at least one emotion, either alone or in conjunction with other data, to select content to be provided to the individual.

A method of carrying out the present invention, in accordance with one embodiment of the present invention, is shown in FIG. 5. Starting at step 500, biometric data is received at step 502. As discussed above, the biometric data can be at least one physical and/or biological characteristics of an individual, including, but not limited to, heart rate, blood pressure, temperature, breathing rate, facial features, changes in speech, changes in eye movement and/or dilation, and chemical compositions (in blood, sweat, saliva, urine or breath). The biometric data is then used to determine a corresponding emotion at step 504, such as happiness, anger, surprise, sadness, disgust, or fear. At step 506 a determination is made as to whether the emotion is the individual's current state, or whether it is based on the individual's response to a thing (e.g., a person, place, information displayed to the individual, etc.). If the emotion is the individual's current state (step 508), then web-based data is selected based on the individual's current emotional state at step 512. If, however, the emotion is the individual's response to a thing (step 510), then web-based data is selected based on the individual's emotional response to the thing at step 510. The selected web-based data is then provided to the individual at step 514, stopping the process at step 516.

It should be appreciated that the present invention is not limited to the method shown in FIG. 5, and methods that includes additional, fewer, or different steps is within the spirit and scope of the present invention. For example, at step 512, the web-based data may be selected using emotion data (or emotion-thing data) and interest data. By way of another example, in step 514, the selected content (e.g., web-based data, text message, email, etc.) may also (or alternatively) be provided to a third person, such as a legal guardian of the individual, a family member of the individual, a medical staff member (if the individual is in the hospital), emergency response (if the individual is not in the hospital), etc. The present invention is also not limited to the steps recited in FIG. 5 being performed in any particular order. For example, determining whether the emotion is the individual's current state or the individual's response to a thing may be performed before the reception of biometric data.

While biometric data, and the like, can be very simple in nature (e.g., identifying the characteristic being measured, such as blood pressure, and the measured value, such as 120/80), it can also be quite complex, allowing for data to be stored for subsequent use (e.g., creating profiles, charts, etc.). For example, in one embodiment of the present invention, as shown in FIG. 6, biometric-sensor data may include detailed data, such as reference-id (technical unique-identify of this datum), entity-id (a user, team, place word or number, device-id), sensor-label (a string describing what is being measured), numeric-value (integer or float), and/or time (e.g., GMT UNIX of when the measurement was taken). As shown in FIG. 7, emotional-response data may include reference-id (technical unique-identifier of this datum), entity-id (a user, team, place word or number, device-id), emotion-label (a string that recognizes this as an emotion), time (e.g., GMT UNIX timestamp when this record was created), emotional-intensity (numeric-value), and/or datum-creation data (a technical reference to what system created this datum and/or which data was used to create this datum). As shown in FIG. 8, emotion-thing data may include reference-id (technical unique-identifier of this datum), entity-id (a user, team, place word or number, device-id), emotion-reference (a reference to a specific emotion documented elsewhere), thing-reference (a reference to a specific thing documented elsewhere), time (e.g., GMT UNIX timestamp when this record was created), correlation-factor (numeric-value representing a scale of correlation, such as a percent), emotional-intensity (numeric-value), and/or datum-creation data (a technical reference to both what system created this datum and/or which data was used to create this datum). As shown in FIG. 9, thing data may include reference-id (technical unique-identifier of this datum), entity-id (a user, team, place word or number, device-id), thing-reference (a reference to specific "thing" documented elsewhere), time (e.g., GMT UNIX timestamp when this records was created), correlation-factor (numeric-value representing a scale of correlation, such as a percent), and/or datum-creation data (a technical reference to both what system created this datum and/or which data was used to create tnis datum). It should be appreciated that the present invention is not limited to the data strings shown in FIGS. 6-9, and other methods of communicating said data is within the spirit and scope of the present invention.

Figure 12:
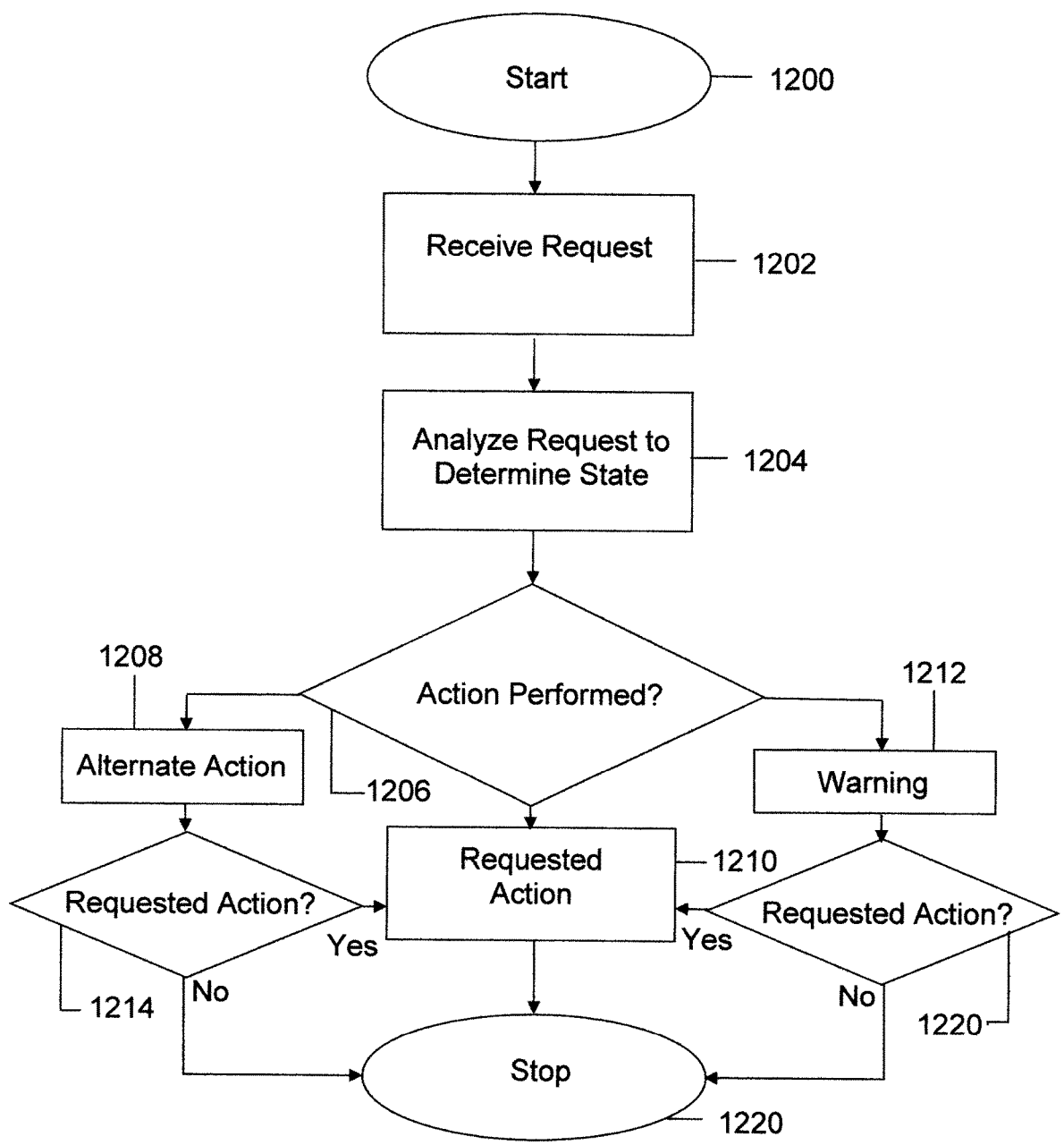
FIG. 12 illustrates a method in accordance with one embodiment of the present invention of using biometric data from an individual to determine at least one state of the individual, and using the at least one state to perform at least one action.

A method of carrying out the present invention, in accordance with another embodiment of the present invention, is shown in FIG. 12. Starting at step 1200, a request is received from a user at step 1202. As discussed above, the request may include a question asked by the user (dictating a response) or a command provided by the user (dictating the performance of an action). The request (or other biometric data) is then analyzed to determine the user's current state at step 1204, such as a corresponding emotional state, mood, physical state, and/or mental state. At step 1206, the user's current state is used to determination whether a particular action should be performed. For example, if the user's state is normal, then the requested action (e.g., the action requested at step 1202) is performed at step 1210, ending the method at step 1220. If the user's state is abnormal, but not alarming (e.g., angry), then a warning may be provided at step 1212. If the user's state is abnormal and alarming (e.g., intoxicated), then a different action (e.g., an action that is different from the one requested at step 1202) may be performed at step 1208. If a warning is provided at step 1212, or a different action is performed at step 1208, then a determination is made at steps 1220 and 1214, respectively, as to whether the requested action (e.g., the action requested at step 1202) should be performed. If the answer is YES, then the requested action is performed at step 1210, ending the method at step 1220. If the answer is NO, then no further action is taken, ending the method at step 1220.

It should be appreciated that the present invention is not limited to the method shown in FIG. 12, and methods that includes additional, fewer, or different steps is within the spirit and scope of the present invention. The present invention is also not limited to the steps recited in FIG. 12 being performed in any particular order.

Having thus described several embodiments of a system and method for using biometric data to determine at least one state, and using the same to perform a particular result (i.e., personalization preference optimization), it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A method for determining a state of a user and performing at least one action in response to said determined state, said determined state being one of an emotional state and a physical state of said user, comprising the steps of:
    receiving by said processor a request from said user to perform an action;
    analyzing at least said request to identify biometric data included therein, said biometric data being compared to data corresponding to known states in order to determine said state of said user; and
    performing said at least one action based on at least said state, wherein said at least one action is said requested action if said state is normal and therefore consistent with said performance of said requested action and said at least one action is a second action if said state is abnormal and therefore inconsistent with said performance of said requested action, said second action including notifying said user of (i) said state and (ii) an alternate action that could be performed instead of said requested action, wherein said alternate action is an unrequested action and different from said requested action, said alternate action being performed if said user indicates in the affirmative that said alternate action should be performed, otherwise, in the absence of said affirmative indication, performing said requested action.

2. The method of claim 1, wherein said biometric data includes at least one of speech pitch and auditory changes.

3. The method of claim 1, wherein said state comprises one of happiness, sadness, surprise, anger, disgust, fear, euphoria, attraction, love, calmness, amusement, excitement, tiredness, well-being, sick.

4. The method of claim 1, wherein said step of receiving said request from said user further comprises receiving an audible command from said user via a microphone.

5. The method of claim 1, further comprising a step of performing both said requested action and said alternate action.

6. The method of claim 1, further comprising the step of prompting said user to explicitly identify their current state.

7. The method of claim 6, wherein said step of prompting said user to explicitly identify their current state further includes providing said user with said determined state.

8. The method of claim 6, wherein said step of using at least said request to determine said state further comprises using at least said explicitly identified state and said request to determine said state.

9. The method of claim 1, further comprising the step of determining an intensity level for said state, said intensity level being a numerical value corresponding to a strength of said state, said alternate action being further based on at least said intensity level.

10. A system for determining at least one state of a user, said at least one state being one of an emotional state and a physical state of said user, comprising:
    at least one processor; and
    at least one memory device in communication with said processor and for storing machine readable instructions, said machine readable instructions being adapted to perform the step of:
        receiving a request from said user to perform an action;
        using at least said request to determine a state of said user by comparing biometric data in said request to data corresponding to known states; and
        performing at least one action, said action being based on at least said state, wherein said action is said requested action if said state is normal and therefore consistent with said performance of said requested action and said at least one action is a second action if said state is abnormal and therefore inconsistent with said performance of said requested action, said second action including notifying said user of (i) said state and (ii) an alternate action that could be performed instead of said requested action, wherein said alternate action is an unrequested action and different from said requested action, said alternate action being performed if said user indicates in the affirmative that said alternate action should be performed, otherwise, in the absence of said affirmative indication, performing said requested action.

11. The method of claim 10, wherein said biometric data includes at least one of speech pitch, auditory changes, breathing pattern, and breathing rate.

12. The system of claim 10, wherein said state is further determined using self-reporting data received from said user prior to said request.

13. The system of claim 10, wherein said state is further determined using self-reporting data received from at least one other user prior to said request.

14. The system of claim 10, wherein said machine readable instructions are further adapted to perform said requested action in addition to said alternate action.

15. The method of claim 10, wherein said machine readable instructions are further adapted to determine a strength of said state, said alternate action being based on at least said strength of said state.

16. A system that uses artificial intelligence (AI) to determine a state and to use said state to perform at least one action, comprising:
 at least one server in communication with a wide area network (WAN);
 a computing device in communication with said at least one server via said WAN, said mobile device comprising;
  at least one processor for downloading machine readable instructions from said at least one server; and
  at least one memory device for storing said machine readable instructions that are adapted to perform the steps of;
   receiving a request from a user to perform an action; and
   performing said at least one action in response to said request;
  wherein at least said request is used to determine said state of said user at a time that said request is received, said request being analyzed for biometric data, said biometric data being compared to data associated with known states to determine said state;
  wherein at least one action is performed after said state is determined, said at least one action being (i) based on said state, (ii) said requested action if said state is normal and therefore consistent with said performance of said requested action, and (iii) a second action if said state is abnormal and therefore inconsistent with said performance of said requested action, said second action including notifying said user of (i) said state and (ii) an alternate action that could be performed instead of said requested action, wherein said alternate action is an unrequested action and different from said requested action, said alternate action being performed if said user indicates in the affirmative that said alternate action should be performed, otherwise, in the absence of said affirmative indication, performing said requested action.

17. The system of claim 16, wherein said machine readable instructions are further adapted to receive self-reporting data from said user, said self-reporting data identifying saki user's current state and being used together with said request to determine said state of said user.

18. The system of claim 16, wherein said biometric data includes at least one of speech pitch, auditory changes, breathing pattern, and breathing rate.

19. The system of claim 16, wherein said machine readable instructions are further adapted to perform the steps of receiving video of said user and analyzing said video for other biometric data, wherein said other biometric data is together with said biometric data in determining said state of said user at said time that said request is received.

20. The method of claim 16, further comprising a step of performing both said requested action and said alternate action.

* * * * *